United States Patent
Lohs et al.

(10) Patent No.: US 6,333,370 B2
(45) Date of Patent: *Dec. 25, 2001

(54) BINDER FOR COATING COMPOSITION

(75) Inventors: Werner Lohs, Zwickau (DE); Robert Thomas Lucas, Caerphilly; Simon Edward Vivian, Monomouthshire, both of (GB)

(73) Assignee: Cray Valley Limited, Gwent (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/322,831

(22) Filed: May 28, 1999

(30) Foreign Application Priority Data

Jun. 1, 1998 (GB) .................................. 9811766

(51) Int. Cl.$^7$ .................................. C09D 167/08
(52) U.S. Cl. .................. 523/502; 523/501; 524/513; 524/539; 524/601; 525/7; 525/7.4; 525/131; 526/290
(58) Field of Search ................. 525/7, 7.4, 131; 526/290; 524/513, 601, 539; 523/501, 502

(56) References Cited

U.S. PATENT DOCUMENTS

| | | | |
|---|---|---|---|
| 3,620,989 | 11/1971 | Cummings | 260/22 CB |
| 4,981,887 | 1/1991 | Ruhoff et al. | 523/501 |
| 5,102,742 | 4/1992 | Hoflan et al. | 428/522 |

FOREIGN PATENT DOCUMENTS

| | | | |
|---|---|---|---|
| 1 454 388 | 11/1976 | (GB) | C08J/3/20 |
| 1 454 414 | 11/1976 | (GB) | C08L/67/08 |
| 2005703 | 4/1979 | (GB) | C08G/63/76 |
| 2 237 576 | 5/1991 | (GB) | C08F/8/30 |
| 2285984 | 8/1995 | (GB) | C09D/167/06 |
| 97/35901 | 10/1997 | (WO) | C08G/63/48 |

*Primary Examiner*—Patricia A. Short
(74) *Attorney, Agent, or Firm*—Whyte Hirschboeck Dudek SC

(57) ABSTRACT

A binder for a coating composition is obtainable as the reaction product of a carboxyl-terminated fatty acid ester with an ethylenically unsaturated carboxylic acid and an ethylenically unsaturated carboxylic acid ester. The carboxylic fatty acid ester is produced by reaction of an autoxidisable fatty acid and a polyol, with modification to introduce at least one terminal carboxyl group. The reaction is optionally effected in an organic solvent which is substantially removed at the end. The material is neutralized with a base to render it water-soluble. Thixotropy can be endowed by an amine/(poly)isocyanate final reaction stage to prior neutralization.

23 Claims, No Drawings

BINDER FOR COATING COMPOSITION

FIELD OF INVENTION

The present invention relates to a water-reducible binder for use in aqueous structured coating compositions such as paints and lacquers.

BACKGROUND

Solvent borne air drying coatings have been used on substrates such as wood and metal for many years. Generally, they are used both to give protection to the substrate and to provide an aesthetically pleasing appearance. Depending upon the nature of the polymeric binder used in the final coating, these decorative air drying coatings can be applied to both interior and exterior surfaces.

For both consumer and professional applications, the predominant organic solvent is conventionally an aliphatic hydrocarbon such as white spirit, which contains around 18% aromatic materials. More recently, white spirit has been replaced with low aromatic analogues which have the benefit of reducing the toxicity of the solvent and at the same time, reducing odour. Other organic solvents such as esters and ketones are often present in small quantities, usually from such additives as driers, fungicides and tinters.

Despite the move towards less toxic and lower odour solvents, the fact that organic solvents are used, still results in their evaporation into the atmosphere after application, thus contributing to atmospheric pollution.

A reduction in the level of volatile organic solvents used in decorative coatings is therefore considered desirable, indeed necessary. The development of high solids paints, with much lower levels of organic solvent, would have a significant impact on atmospheric pollution. However, the introduction of such products has been delayed due to the lack of enforcing legislation and their relatively higher price.

An alternative to the organic solvent as a mobile carrier for the resin, pigment etc., is water. Water based decorative coatings have been available for many years and the most common types are generally formulated on thermoplastic (co)polymers derived from monomers such as vinyl acetate, vinyl acetate/Veova, vinyl acetate/ethylene copolymers, styrene, styrene/methacrylates. In these cases, the polymer is formed by emulsion polymerisation in the aqueous phase, to produce an emulsion with dispersed discrete particles. Polymers formed by this process usually have a very high molecular weight. In order for coatings to be formed from these polymers, the particles must coalesce to form a coherent resistant film. Due to the nature of the polymerisation process, water sensitive materials remain in the thermoplastic coating.

Air drying water borne resins have also been available for many years. These may be alkyds with high acid value. Traditionally, this acidity has been achieved by ring opening of trimellitic anhydride by reaction with a hydroxyl terminated alkyd. The alkyd may then be thinned to about 70% to 80% in a water miscible organic solvent such as butyl glycol and neutralized with ammonia or amine, to render the product water dilutable. These materials have never achieved commercial success in the decorative paint market, due to high solvent content and poor application and performance properties.

Alkyd emulsions are another route to producing water based decorative coatings. It is reasonable to assume that these will retain their oxidative nature and so crosslink after application. However, they have not gained a large commercial success in decorative paints and varnishes, due to performance related problems, such as yellowing, drying, drier stability, water resistance and poor rheology.

Therefore, there is still a need for an autoxidisable binder for water-based coatings which can produce finished coatings with higher abrasion resistance and/or hardness, are preferably also faster-drying and in the case of the known high-acid resins, contain less organic solvent.

One preferred sub-class of binders according to the invention comprises those which result in thixotropic coating compositions. Therefore, it is convenient here to review the prior art relating to thixotropic system.

The solvent based coatings widely used in the domestic consumer market are generally thixotropic in appearance. That is to say that the paint exhibits time dependent recovery. In the undisturbed state at low shear rates, these coatings, which can be paints, varnishes or stains, have a high apparent viscosity. The actual low shear viscosity will depend upon the degree of structure in the coating but in a typical non-drip coating the low shear viscosity would be in the order of 1 000 000 mPa.s. This has the effect of making the coating appear like a jelly in the indisturbed state in the can before application. At high shear rates, typically those experienced when the paint is brushed out, the paint will exhibit the viscosity characteristics of a liquid paint thus allowing easy application. Once brushing is stopped, the paints will show a recovery in viscosity and structure with time. This will allow the paints to flow and level on the substrate without sagging, thus giving a coating which is uniform in thickness and virtually free from brush marks.

This thixotropic character can conveniently be measured using a constant stress rheometer and undertaking an oscillation recovery sweep. The parameters measured are the elastic modulus G' and the viscous modulus G". Immediately after applying a shearing force, the viscous modulus will dominate and the paint will flow. As time passes, both G' and G" show an increase. With a thixotropic material, the rate of increase in the elastic modulus will be faster than G" and will eventually overtake the viscous modulus, at which time the product can be considered to be more solid in nature and will now no longer sag.

Any product which after a period of time after applying a shearing force will show a curve in which G' increases at a faster rate than G" can be considered thixotropic.

The truly thixotropic solvent based coatings, widely available in the domestic consumer market, are usually based on autoxidisable binders which have been chemically modified by polyamide technology or urethane/urea technology as described in GB-A-1,454,388 and GB-A-1,454,414.

Other known means of imparting structure into solvent based coatings, which is not truly thixotropic, is by means of clays, silicas, amide additives, hydrogenated castor oil additives.

The water based binders described above, whether they are the thermoplastic emulsion (co)polymers or alkyd emulsions, which are widely used in the domestic decorative market, are not inherently thixotropic. Any structure, which these materials have, is imparted by the addition of additives at the paint manufacturing stage and not by chemical modification of the binder itself.

There have been other proposals for thixotropic systems which are aqueous, for example utilising the binder disclosed in GB-A-2,237,576. It is based on an acrylic polymer having hydroxyl and carboxylic acid pendant groups. This polymer material is made thixotropic by reaction with an isocyanate having at least two isocyanate groups, an amine having at least two amino groups and a primary or secondary monoamine. However, although these polymers are water-dispersed, their ability to post-cure, and therefore their final film performance is limited.

Thus, to date, there remains a need for a commercially viable water based coating system and in particular, a binder therefore, which system can be produced in thixotropic or non-thixotropic form as required.

SUMMARY OF INVENTION

The present invention now provides a binder for a water-based coating composition, the binder being obtainable as the product of a reaction mixture comprising:

a) a carboxy-terminated fatty acid ester obtainable as the reaction product of an autoxidisable fatty acid and a polyol followed by a reaction to attach a carboxy group, b) an ethylenically unsaturated carboxylic acid, and c) an ester of an ethylenically unsaturated carboxylic acid.

Binders according to the present invention, are suitable for incorporation in water borne coating compositions such as (depending on the particular binder in question) paints, lacquers, varnishes or stains.

In its broadest definition, the present invention encompasses binders for water-borne coatings which result in non-thixotropic compositions, those which result in thixotropic compositions and those which are precursors (i.e. capable of conversion to) binders which result in thixotropy. Moreover, the binders of any of the aforementioned classes may in themselves be provided in neutralized form, ready for use in the manufacture of coating compositions or in un-neutralized form for neutralization by the manufacturer. The invention also encompasses coating compositions containing any of these compositions.

DETAILED DESCRIPTION AND PREFERRED EMBODIMENT OF THE INVENTION

The binders of the present invention render the final composition air-drying because they are obtained from an autoxidisable fatty acid which has been esterified with a polyol and then terminated with a carboxy group.

Binders according to the present invention, whether or not for producing thixotropy when incorporated in the final coating product, confer one or more advantages in performance in comparison with water-borne compositions based on conventional binders. These advantages are selected from one or more at higher abrasion resistance, increased hardness, faster drying and the need for less organic solvent in the final reaction mixture.

However, coatings intended for application other than as floor coatings require some degree of rheological control to provide adequate application properties in terms of flow, leveling and sag control. This is normally achieved in solvent based coatings by the use of thixotropic binders or by the use of thixotropic additives which are added during the paint manufacturing process.

Preferably, in order to provide a water based thixotropic coating, binders according to the present invention are modified such that they become thixotropic (i.e. confer thixotropy in the final coating compositions) without the use of other external additives. In these instances, the resulting products will not necessarily be truly water soluble.

This modification to provide thixotropy in the final product is obtained by making a precursor material which is obtainable when a hydroxy functional monomer material is included in the reaction mixture with reactants (a), (b) and (c). The precursor is then converted to a thixotropic binder by reaction with at least one amine, followed by reaction with an isocyanate material.

Water reducibility of the final product can be achieved by neutralizing with an appropriate base, for example one or more materials selected from ammonia, primary, secondary and tertiary amines and alkali metal hydroxide. Suitable amines include triethylamine, diisopropylamine, triethanolamine, dimethylethanolamine and morpholine.

Regarding starting materials, modified autoxidisable fatty acids are known. Typical autoxidisable fatty acids are the unsaturated fatty acids which are known as "drying oils" and are found in various mixtures in natural substances such as soya bean oil, sunflower oil or safflower oil, e.g. oleic, linoleic and linoleic acids. For example, 9,12-octadecanoic acid is a constituent of soya bean oil and sunflower oil. Those acids having at least two double bonds, having no methylene linkage therebetween (i.e. the conjugated fatty acids) are preferred for faster drying. Most useful examples have from 15 to 24 carbon atoms. The carboxyl-terminated polyol esters of these acids are conveniently prepared by a first reaction stage, starting with the fatty acid and a polyhydric alcohol. The fatty acid ester undergoes a second stage of reaction to yield the carboxy-terminated fatty acid ester which preferably contributes from 20% to 80% of the weight of the resultant binder, whether unmodified or in the neutralized and/or thixotropically modified forms which will be explained in more detail hereinbelow.

Preferably, the first-stage (uncarboxylated) fatty acid ester is formed by reacting fatty acids with polyhydric alcohols at eg. 200° to 250° C. to an acid number of between 0 and 10 mgKOH/g, preferably to less than 5 mgKOH/g.

Suitable vegetable oil fatty acids include non-conjugated, conjugated or mixtures of both. Suitable examples of non-conjugated acids include linoleic acid, linolenic acid, tall oil fatty acids, linseed fatty acids, soya bean fatty acids, and sunflower fatty acids. Suitable examples of conjugated fatty acids include dehydrated castor oil fatty acid, the UKD products supplied by Henkel such as UKD3510 and UKD6010 and the Unichema products PRIFAC7967 and 7968.

The fatty acid is esterified with one or more polyhydric alcohols which contains two or more hydroxyl groups per molecule. Typical examples include 1,6-hexane diol, glycerol, trimethylol propane, pentaerythritol, di-trimethylol propane and di-pentaerythritol.

The resultant fatty acid ester contains an excess of hydroxyl groups, preferably yielding a product with a hydroxyl number of between 10 and 100 mgKOH/g preferably between 20 and 70 mgKOH/g.

After reaction, of the fatty acid and the polyol, a subsequent reaction is effected to attach at least one carboxylic acid group. This is conveniently effected by reaction with a carboxylic acid anhydride such as trimellitic anhydride (TMA), maleic anhydride, phthalic anhydride, tetrahydrophthalic anhydride, or pyromellitic anhydride, or a mixture of any two or more thereof. The final acid value of the thus carboxylated fatty acid ester is from 10 to 100 and preferably from 20 to 70 mgKOH/g.

In a preferred embodiment of this first stage of reaction, the fatty acids and polyols are charged to the reactor and heated to a maximum of 250° C., removing water until the acid number falls to less than 10 mgKOH/g, preferably to less than 5 mgKOH/g. The resultant fatty acid ester is then cooled to 170° C. and TMA is added. The mixture is held at 170° C. until ring opening of the TMA has occurred, yielding a product with an acid value of between 10 and 100 mgKOH/g preferably between 20 and 70 mgKOH/g.

The next stage of the process is then to copolymerise the ethylenically unsaturated acid and ester monomers in the presence of the carboxy-terminated fatty acid ester. These monomers preferably comprise acrylic acid and/or methacrylic acid together with one or more esters of acrylic acid and/or one or more esters of methacrylic acid.

Suitable esters of acrylic or methacrylic acids are those containing 1–12 carbon atoms such as methyl (meth) acrylate, butyl (meth)acrylate, isobutyl (meth)acrylate, ethyl (meth)acrylate, ethyl hexyl acrylate, glycidyl (meth) acrylate, hydroxyethyl (meth)acrylate and hydroxypropyl (meth)acrylate. Preferred examples are methyl methacrylate, butyl methacrylate, butyl acrylate, hydroxy ethyl methacrylate and methacrylic acid mixed in the appropriate ratios. Preferably, an "equivalent" polymer formed only by polymerisation of reactants (b) and (c) and optionally, any additional ethylenically unsaturated monomer(s) (see below) in the same amounts as in the binder according to the present invention has a glass transition temperature of from 263° K. to 373° K., preferably from 273° K. to 343° K.

It is necessary to employ both the ethylenically unsaturated carboxylic acid and the ester of an unsaturated carboxylic acid. The former is necessary to incorporate the required acid functionality. The latter is necessary to ensure the hardness of the final coating. The ester does not necessarily have to be an ester of the same ethylenically unsaturated acid which is incorporated in the form of acid per se. Mixtures of different acids and/or different esters could be employed. In general, the ratio of acid to ester is preferably from 0.1:1 to 0.22:1 by weight.

It is also preferred to include in the reaction mixture with the carboxyl-terminated fatty acid ester, the ethylenically unsaturated carboxylic acid and the ester of an ethylenically unsaturated carboxylic acid, an additional ethylenically unsaturated monomer component comprising one or more suitable ethylenically unsaturated monomers such as vinyl toluene or styrene or one of its derivatives (such as α-methyl styrene). Of course, mixtures of such other unsaturated monomers may also be used. These additional unsaturated monomers can provide additional benefits such as hardness and durability.

The selection of the particular monomers for the mixture overall, depends on a number of factors but especially on the polymer's final application and performance requirements, including the aforementioned acid number of 20 to 75 mgKOH/g, but most preferably 35 to 70, to allow for neutralization, prior to dilution in water.

This reaction is preferably carried-out in the presence of an organic solvent in order to facilitate the manufacture and handleability of the finished product, before dilution with water. The choice of organic solvent for this stage can be a water miscible solvent, which will still be present, and in fact will be required to be in, the final neutralized and water thinned resin. Alternatively, the solvent for this stage may be one which simply acts as a medium for the addition polymerisation and which will be removed after this stage of the process. In this case, an addition of a water-miscible co-solvent will be required before neutralizing and dilution with water.

In any event, it is preferred that the solvent (if used) in this stage does not contain any labile hydroxyl groups, as these will esterify with the carboxyl groups present in the monomer mixture and/or the fatty acid ester. Where a hydroxyl containing solvent is used in the final product, then a non reactive solvent such as xylene or toluene can be used, this then being removed after the addition polymerisation.

When the addition of the carboxylic acid group (e.g. by a ring opening reaction with a corresponding anhydride) is complete, the product is cooled to a suitable temperature. This temperature is determined by the nature of the carrier solvent and the choice of polymerisation catalyst. Preferably, the solvent is added to a level of 20 to 50%, calculated on the weight of the overall reaction mixture.

In a typical reaction, a mixture consisting of ethylenically unsaturated ester and acid monomers is prepared and a polymerisation catalyst is also added. Preferably, this mixture is added to the carboxy-terminated fatty ester solution over a period of 2 to 8 hours. Typically, the temperature of the reaction can be between 70° C. and 170° C., preferably between 110° C. and 140° C.

Typical polymerisation catalysts are di-tertiary butyl peroxide, tertiary butyl perbenzoate, tertiary butyl octoate, di-tertiary-amyl peroxide, dicumyl peroxide and 1,1 bis (tertiary butyl peroxy) cyclohexane.

After the monomers have been added, the resin is preferably held on temperature until polymerisation is complete. If necessary, further additions of polymerisation catalyst can be made, to ensure complete conversion.

When the reaction is complete, a part of the process solvent is removed, preferably by vacuum distillation. If the processing solvent is the same as that desired in the final resin, then enough is removed to give a non volatile content (NVC) of from 70 to 95% by weight, preferably from 75 to 95%. If an intermediate processing solvent, such as xylene, is used, then substantially all of this is removed, and the preferred water miscible solvent is added to give a non volatile content of from 70 to 95%, preferably from 75 to 95% by weight resin. For avoidance of doubt, in the context of the present invention, the term "substantially all removed" means that afterwards, the non volatile content of the mixture is more than 90% by weight, preferably more than 95% by weight, and especially more than 98% by weight. Suitable examples of water miscible solvents include any alcohol, glycol ether, glycol ether ester or a mixture of such solvents. Examples are, but not limited to, propan-1-ol, propan-2-ol, butan-1-ol, butan-2-ol, butyl glycol, propylene glycol, propylene glycol monomethyl ether acetate, dipropylene glycol mono methyl ether, propylene glycol dimethyl ether and N-methyl pyrrolidone.

Water reducibility can be conferred by the neutralization of the resin before addition of water as hereinbefore described. This is effected by adding ammonia or amines such as triethylamine, diisopropylamine triethanolamine, dimethylethanolamine or morpholine.

As mentioned above, to induce thixotropy in the final product, a precursor is made by including a hydroxy functional material in the reaction mixture of (a), (b) and (c) and this precursor is then reacted with at least one amine (preferably a monoamine or diamine or mixture thereof followed by reaction with at least one isocyanate (either a monofunctional or polyfunctional isocyanate or mixture thereof).

In a preferred embodiment, the precursor resin in solution (preferably in an organic solvent) is warmed and then reacted preferably with a mixture of mono and diamines. Further reaction of the amine salts so produced is then undertaken by the introduction of polyisocyanate containing materials. Upon complete reaction of the amine groups, further amine is added to react with the residual carboxylic acid groups of the polymer. Finally, the reaction mixture is diluted with water to give a water dispersible thixotropically modified binder.

Examples of suitable mono and diamines include (but are not restricted to) ammonia, diethylamine, triethylamine, morpholine, 4-ethyl morpholine, ethanolamine, dimethyl amino propylamine, diethanolamine, methyl diethanolamine, ethylene diamine, hexamethylene diamine and m-xylene diamine.

Examples suitable of suitable monofunctional isocyanates include (but are not restricted to) methyl-, ethyl-, cyclohexyl- and phenyl-isocyanates and the reaction product of toluene diisocyanate and a monofunctional alcohol such as ethanol, butanol, cyclohexanol, tridecanol or butyl glycol.

Suitable polyfunctional polyisocyanate materials include (but are not restricted to) isophorone diisocyanate, tolylene 2,4 diisocyanate, tolylene 2,6 diisocyanate, diphenyl methane diisocyanate, hexamethylene diisocyanate, proprietary material such as the dimer of hexamethylene diisocyanate sold as Tolonate HDB and a trimer of hexamethylene diisocyanate sold as Tolonate HDT both produced by Rhone Poulenc.

It is desirable to have a slight excess of amine over the isocyanate groups. The ratio of isocyanate to amine groups may for example be from 0.9:1 to 1:0.9 but it is preferably less than or equal to 1:1.

The resins produced can be converted to coatings by the addition of pigments, extenders, driers, fungicides, antioxidants and other additives that are well known in the industry. The resins described can also be converted to clear varnishes.

The present invention will now be explained in more detail by way of the following non-limiting examples.

EXAMPLES

Example 1

A fatty acid ester was made by reacting 130.8 parts of sunflower fatty acid and 32.7 parts of Prifac 8960, a conjugated fatty acid available from Unichema, with 41.8 parts of di-trimethylol propane. The mixture was heated slowly to 240° C. and water removed until the acid number was less than 4 mgKOH/g. The fatty acid ester was cooled to 170° C. and 13.2 parts of trimellitic anhydride was added. The mixture was held at 170° C. for 30 minutes then cooled to 140° C. 379.0 parts of dipropylene glycol dimethyl ether was added and the temperature held at 140° C.

A mixture of 47.3 parts of methacrylic acid, 181.8 parts of methyl methacrylate, 131.3 parts of butyl methacrylate, 25.4 parts of butyl acrylate and 16.7 parts of tertiary-butyl perbenzoate was prepared and added to the fatty ester over 3–4 hours. When all of the monomer mixture had been added, the product was held at 140° C. for a further four hours.

Vacuum was applied and the solvent removed until the non volatile content was higher 80% by weight. Vacuum was released and the resin diluted to 75.3% NVC with butyl glycol. The product was cooled and discharged. It had a colour of 5 Gardner, a viscosity at 25° C. of 143,300 mPa.s, a non volatile content of 75.3% and an acid number of 65.7 mgKOH/g.

The product was neutralized with diisopropylamine and diluted to 30% non volatile content with water, to give a clear solution. Suitable driers (Combi LS) were added to give a final clear lacquer with an NVC of 30.2%, viscosity of 300 mPa.s at 25° C. and a pH of 10. A film of this lacquer had a sand dry time of 30 minutes and was through dry in 1 hour, to give a coating with a Koening hardness of 14.4% after 1 day, 18.0% after 7 days and a 60° gloss of 90%.

Example 2

A fatty acid ester was made by reacting 122.4 parts of sunflower fatty acid and 30.6 parts of conjugated fatty acid Prifac 8960, with 39.1 parts of di-trimethylol propane. The mixture was heated slowly to 240° C. and water was removed until the acid number was less than 4 mgKOH/g. This fatty acid ester was cooled to 170° C. and 12.4 parts of trimellitic anhydride was added. The mixture was held at 170° C. for 30 minutes then cooled to 138° C. 354.9 parts of xylene was added and the temperature held at 138° C.

A mixture of 44.3 parts of methacrylic acid, 122.4 parts of methyl methacrylate, 123.1 parts of butyl methacrylate, 71.6 parts of butyl acrylate and 15.6 parts of tertiary-butyl perbenzoate was prepared and added to the fatty ester over 3–4 hours. When all of the monomer mixture had been added, the product was held at 138° C. for a further four hours.

Vacuum was then applied and the xylene removed until the non volatile content was higher than 98%. Vacuum was released and the resin diluted to 90% NVC with butyl glycol. The product was cooled and discharged. It had a colour of 5 Gardner, a viscosity at 100° C. of 3,050 mPa.s, a non volatile content of 90.1% and an acid number of 59.1 mgKOH/g.

The product was neutralized with ammonia and diluted with water to give a clear solution. Suitable driers (Combi LS) were added to give a final clear lacquer with an NVC of 25.9%, a viscosity of 80 mPa.s at 25° C. and a pH of 9.1. A film of this lacquer had a sand dry time of 24 minutes and was through-dry within 7 hours to give a coating with a Koening Hardness of 6.9% after 1 day, 10.6% after 7 days and a 60° gloss of 89%.

Example 3

A fatty acid ester was made by reacting 135.5 parts of Tall Oil fatty acid and 33.9 parts of conjugated fatty acid Prifac 8960, with 23.6 parts of pentaerythritol. The mixture was heated slowly to 240° C. and water was removed until the acid number was less than 4 mgKOH/g. This fatty acid ester was cooled to 170° C. and 12.4 parts of trimellitic anhydride added. The mixture was held at 170° C. and 12.4 parts of trimellitic anhydride added. The mixture was held at 170° C. for 30 minutes then cooled to 138° C.

354.4 parts of xylene was added and the temperature held at 138° C.

A mixture of 44.2 parts of methacrylic acid, 122.3 parts of methyl methacrylate, 123.0 parts of butyl methacrylate, 71.6 parts of butyl acrylate and 15.6 parts of tertiary-butyl perbenzoate was prepared and added to the fatty ester over 3–4 hours. When all of the monomer mixture had been added, the product was held at 138° C. for a further four hours.

Vacuum was applied and the xylene removed until the non volatile content was higher than 98%. Vacuum was released and the resin diluted to 90% NVC with butyl glycol. The product was cooled and discharged. It had a colour of 6 Gardner, a non volatile content of 89.8% and an acid number of 61.0 mgKOH/g.

This resin was converted to a coating using the following formulation:

| Resin at 89.8% solids | 55.5 |
|---|---|
| Water | 40.0 |
| Ammonia solution (35%) | 4.5 |
| Bayowett 448 | 0.25 |
| Combi LS (driers) | 1.0 |
| Methyl ethyl ketoxime | 0.25 |
| Water | 90 |

The resin was heated to 50° C. and the premixed water/ammonia, also at 50° C., was added until the resin was neutralized to pH 8.5–9.0, at which time the solution became clear. The remaining components were added under slow stirring conditions, with the final amount of water being added to give shear viscosity of 200 mPa.s at 10,000 sec$^{-1}$.

A film cast from this solution had sand dry time of 50 minutes, a hard dry time of 4 hours. There was no evidence of tack after 24 hours drying and the film had excellent gloss and water resistance.

Example 4

A fatty acid ester was made by reacting 113.9 parts of sunflower fatty acid and 28.5 parts of conjugated fatty acid Prifac 8960, with 36.3 parts of di-trimethylol propane. The mixture was heated slowly to 240° C. and water removed until the acid number was less than 4 mgKOH/g. This fatty acid ester was cooled to 170° C. and 11.5 parts of trimellitic anhydride added. The mixture was held at 170° C. for 30 minutes then cooled to 138° C.

330.0 parts of xylene was added and the temperature held at 138° C.

A mixture of 25.8 parts of methacrylic acid, 113.8 parts of methyl methacrylate, 114.4 parts of butyl methacrylate, 66.6 parts of butyl acrylate, 15.3 parts of hydroxy ethyl methacrylate and 14.5 parts of tertiary-butyl perbenzoate was prepared and added to the fatty ester over 3–4 hours. When all of the monomer mixture had been added, the product was held at 138° C. for a further four hours.

Vacuum was applied and the xylene removed, until the non volatile content was higher than 98%. Vacuum was released and the resin diluted to 80% NVC with butyl glycol. The product was cooled and discharged. It had a colour of 3 Gardner, a non volatile content of 79.8% and an acid number of 45.5 mgKOH/g.

The resin was converted to a coating using the following formulation:

| Resin at 79.8% solids | 62.5 |
|---|---|
| Water | 40.0 |
| Ammonia solution (35%) | 4.1 |
| Bayowett 448 | 0.25 |
| Combin LS (driers) | 1.0 |
| Methyl ethyl ketoxime | 0.25 |
| Water | 90 |

The resin was heated to 50° C. and the premixed water/ammonia, also at 50° C. was added, until the resin was neutralized to pH 8.5–9.0, at which time the solution became clear. The remaining components were added under slow stirring conditions, with the final amount of water being added to give a high shear viscosity of 200 mPa.s at 10,000 sec$^{-1}$.

A film cast from this solution had sand dry time of 1 hour 10 minutes, a hard dry time of 4 hours 15 minutes. There was no evidence of tack after 24 hours drying and the film had excellent gloss and water resistance.

The above procedure was repeated, but the ammonia solution was replaced with 3.2 g di-isopropylamine. A clear varnish was obtained, but upon application, the sand dry and hard dry times were extended to 5 hours and 12 hours respectively. The cast film still showed some tack after overnight drying and had inferior water resistance.

Example 5

85.1 parts of the resin solution from Example 4 (80% in butyl glycol) were heated to 50° C. 2.021 parts of morpholine were added and the mixture stirred for 10 minutes, after which time 0.59 parts of ethylene diamine were added. After a further 10 minutes period of stirring at 50° C., 7.50 parts of Tolonate HDT were added. The mixture was held at 50° C. for 30 minutes to allow reaction of the amine. 4.789 parts of morpholine were then stirred in for 10 minutes. Finally, water at 50° C. was slowly added with stirring to give a water dispersible thixotropic binder with a solids content of 40% and a pH-9.

Apart from the obvious presence of thixotropy as noted visually, thixotropy was also verified by determining a preshear oscillation recovery curve in which it was observed that the elastic component G' after a period of 800 seconds dominates the viscous component G".

Example 6

80 parts of the binder from Example 4 diluted in 80% NVC in dipropylene glycol dimethyl ether were heated to 50° C. 1 part of xylene diamine was added and the mixture stirred for 10 minutes, after which time 6.3 parts of a tridecanol/TDI adduct was added and the mixture stirred for a further 10 minutes. 4.4 parts of morpholine was added and the mixture stirred. Finally, 140 parts of water @ 50° C. was added slowly with stirring to give a water reducible thixotropic binder with a solids content of 31.4%.

What is claimed is:

1. A binder for a water-based coating composition, the binder comprising the product of a reaction mixture consisting essentially of:
   (a) a carboxy-terminated fatty acid ester, obtained by reaction in two successive stages:
      a first stage where a fatty acid ester is formed by reacting autoxidisable fatty acids with polyhydric polyols at 200° C. to 250° C. to an acid number of less than 10 mg of KOH/g and with the resultant fatty acid ester having an hydroxyl number of between 10 and 100 mg KOH/g
      a second stage with reaction of the fatty acid ester of the first stage with a carboxylic acid anhydride at a temperature lower than that of the first stage to obtain the carboxy-terminated fatty acid ester, with an acid value of between 10 and 100 mg KOH/g;
   (b) an ethylenically unsaturated carboxylic acid;
   (c) an ester of an ethylenically unsaturated carboxylic acid,
   (d) optionally, an ethylenically unsaturated monomer, other than an ethylenically unsaturated carboxylic acid, and
   (e) optionally, a hydroxyl functional monomer material.

2. A binder according to claim 1, wherein an ethylenically unsaturated monomer, other than an ethylenically unsaturated carboxylic acid, is also included in the reaction mixture.

3. A binder according to claim 2, wherein an equivalent polymer, formed only from polymerization of reactants (b)

and (c) and the ethylenically unsaturated monomer, has a glass transition temperature of from 263° K. to 373° K.

4. A binder according to claim 3, wherein the equivalent polymer has a glass transition temperature of from 273° K. to 343° K.

5. A binder according to claim 2, wherein the reaction mixture further includes an organic solvent.

6. A binder according to claim 1, wherein a hydroxyl functional monomer material is also included in the reaction mixture.

7. A thixotropic binder comprising the reaction product of a binder according to claim 6, with at least one amine, followed by reaction with an isocyanate material.

8. A binder according to claim 6, wherein the reaction mixture further includes an organic solvent.

9. A binder according to claim 1, wherein the reaction mixture is reacted in the presence of an organic solvent.

10. A binder according to claim 9, wherein the organic solvent is substantially removed after completion of the reaction.

11. A binder according to claim 1, in which an equivalent polymer formed only from polymerisation of reactants (b) and (c) has a glass transition temperature of from 263° K. to 373° K.

12. A binder according to claim 11, wherein the equivalent polymer has a glass transition temperature of from 273° K. to 343° K.

13. A binder according to claim 1, having a final acid number of from 20 to 75 mgKOH/g.

14. The binder according to claim 8, having an acid number of from 35 to 70 mgKOH/g.

15. A binder according to claim 1, wherein the reaction mixture further includes from 20% to 50% by weight of organic solvent based on the weight of the reaction mixture.

16. A binder according to claim 12, wherein the fatty acid is a non-conjugated acid or a conjugated acid, or a mixture of non-conjugated and conjugated acids.

17. A binder according to claim 1, wherein the carboxylated fatty acid ester contributes from 20% to 80% by weight of the binder.

18. A binder obtainable by neutralizing the binder according to claim 1.

19. A coating composition comprising a binder according to claim 18, and water.

20. A binder according to claim 1, wherein the fatty acid and polyol are reacted to an acid number of less than 5 mgKOH/g.

21. A process for producing a binder for a water-based coating composition, the process comprising the steps of:

(a) reacting an autoxidisable fatty acid and a polyol;

(b) reacting the product of (a) with a carboxyl containing organic compound to attach a carboxyl group;

(c) introducing an ethylenically unsaturated carboxylic acid and an ester of an ethylenically unsaturated carboxylic acid to the reaction product of (b); and (d) reacting the combination of (c) to obtain the binder.

22. The process of claim 21, wherein an ethylenically unsaturated monomer other than an ethylenically unsaturated carboxylic acid, is introduced to the reaction mixture in step (c).

23. The process of claim 21, wherein the reaction further comprises an organic solvent.

* * * * *